Sept. 16, 1930. D. CURRIE ET AL Re. 17,798

CORN HARVESTING AND HUSKING MACHINE

Original Filed April 7, 1924 3 Sheets-Sheet 1

E. R. Rupfert.

WITNESS:

Dugald Currie
Donald Currie
INVENTOR

BY Victor J. Evans
ATTORNEY

D. CURRIE ET AL

Sept. 16, 1930. CORN HARVESTING AND HUSKING MACHINE Re. 17,798

Original Filed April 7, 1924 3 Sheets-Sheet 2

E. R. Ruppert.

WITNESS:

Dugald Currie
Donald Currie
INVENTOR

BY Victor J. Evans
ATTORNEY

D. CURRIE ET AL

Sept. 16, 1930. CORN HARVESTING AND HUSKING MACHINE Re. 17,798

3 Sheets-Sheet 3

Original Filed April 7, 1924

E. R. Rupprecht.

WITNESS:

Dugald Currie
Donald Currie
INVENTOR

BY Victor J. Evans
ATTORNEY

Reissued Sept. 16, 1930

Re. 17,798

UNITED STATES PATENT OFFICE

DUGALD CURRIE AND DONALD CURRIE, OF ODEBOLT, IOWA

CORN HARVESTING AND HUSKING MACHINE

Original No. 1,702,200, dated February 12, 1929, Serial No. 704,819, filed April 7, 1924. Application for reissue filed April 21, 1930. Serial No. 446,114.

This invention relates to improvements in corn harvesting machines, the general object of the invention being to provide means for moving the snapping means so that the ears will be snapped with but little effort and to permit the machine to be constructed of light weight and draft.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which.

Figure 1:
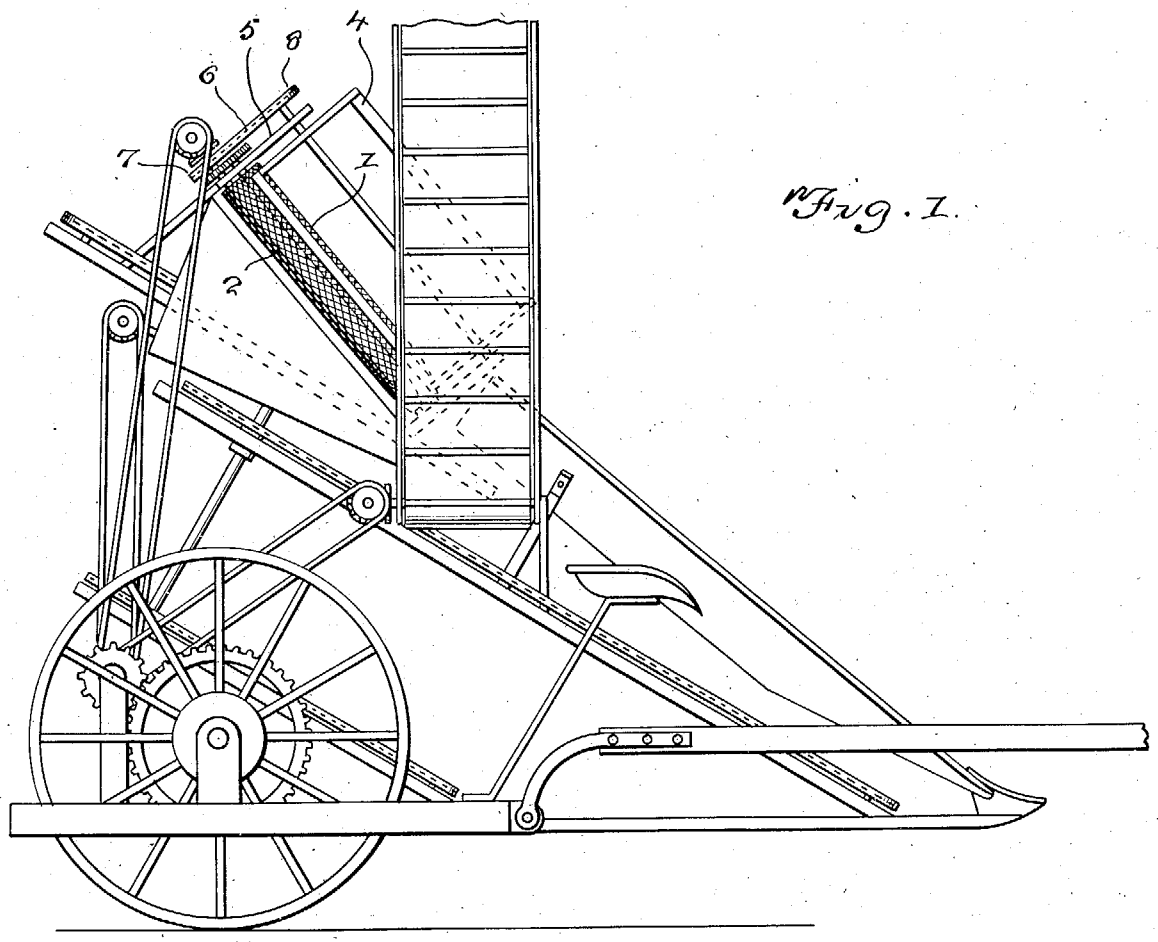
Figure 1 is a side view of a corn harvester showing our invention applied thereto.
Figure 2:
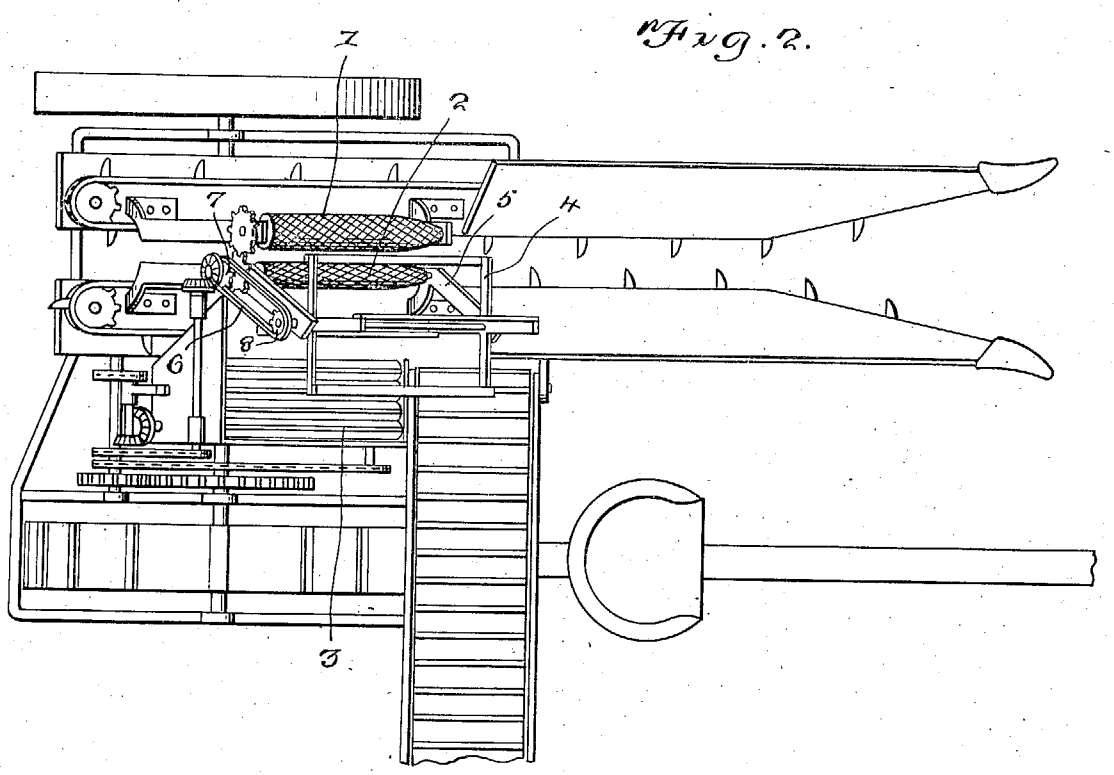
Figure 2 is a plan view.
Figure 3:
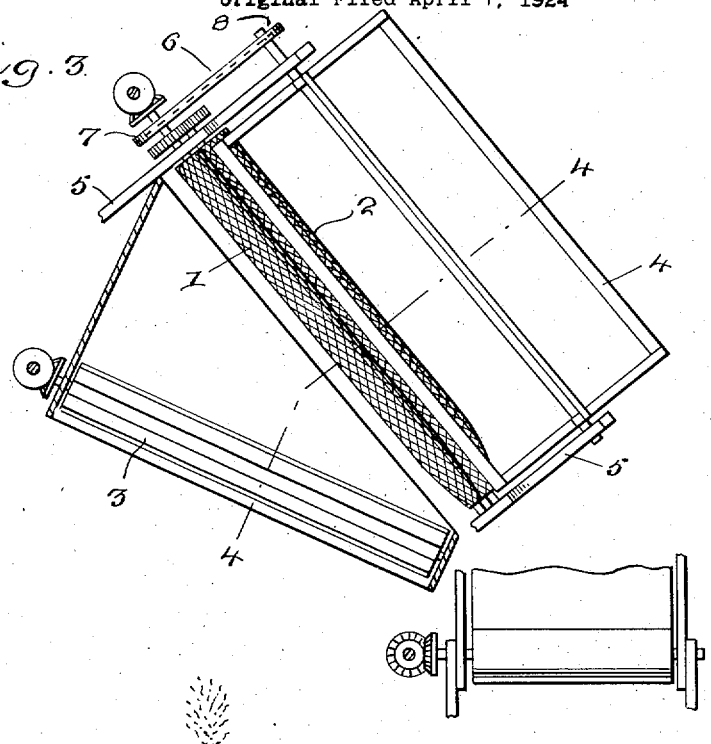
Figure 3 is a sectional detail view.
Figure 4:
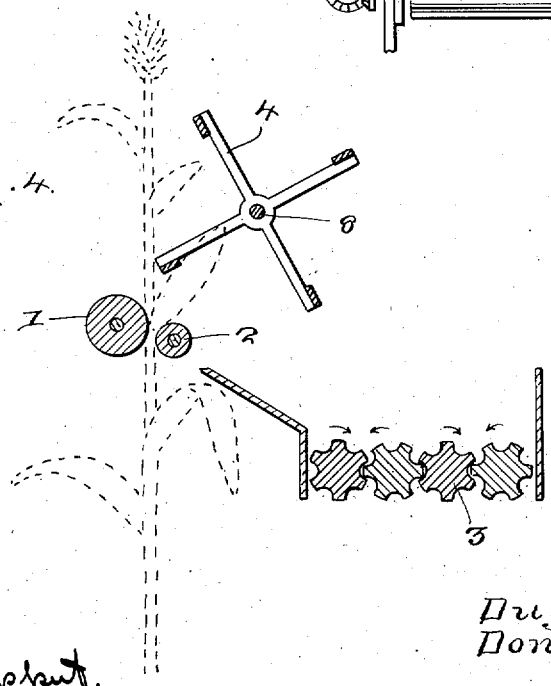
Figure 4 is a diagrammatic view showing the operation of the device.

As shown in these views, we make the snapping rollers 1 and 2 of different diameters with the small roller 2 closer to the husking mechanism 3 and slightly below the large roller so that the ear is slightly tilted towards the husking mechanism when engaged by the snapping rollers. We also provide a reel 4 for knocking the ears of corn off the stalk as they are tilted by the snapping rollers. Thus the snapping or picking mechanism can be made of light construction and will need but little power to operate it. This mechanism will pick the ears from the stalks practically the same as human labor would do it and the reel knocks the ears into the husking mechanism. This mechanism snaps the ears off the stalks instead of pinching the ears off the stalks as is now done.

The reel 4 is supported by the arms 5 forming a part of the frame and it is driven from the small snapping roller by the chain 6 which passes over the sprockets 7 on the snapping roller and on the shaft 8 of the reel.

The improvement can be placed on corn harvesters of any desired type, the drawings simply showing a conventional form of harvester. The snapping rollers have their forward ends tapered so that the stalks can easily pass between them.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:

In a corn harvesting machine, the combination of a pair of rolls arranged side by side, means for rotating them in a direction required for pulling stalks of corn downwardly between them, one of said rolls having its upper surface higher than the other one, and whereby when the butt of an ear of corn engages both rolls and the stalk is being forced downwardly between the rolls, the ear will be moved to position inclined upwardly and outwardly from the lower roll, snapping bars, and means for moving them in a path to enter between the stalk and the ear directly over the lower roll and then downwardly toward the lower roll and outwardly from the lower roll.

DUGALD CURRIE.
DONALD CURRIE.